(12) United States Patent
Lin (10) Patent No.: US 11,817,273 B2
(45) Date of Patent: Nov. 14, 2023

(54) CAPACITOR ELEMENT

(71) Applicant: APAQ TECHNOLOGY CO., LTD., Miaoli County (TW)

(72) Inventor: Chieh Lin, Hsinchu County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 401 days.

(21) Appl. No.: 17/024,847

(22) Filed: Sep. 18, 2020

(65) Prior Publication Data
US 2021/0287856 A1  Sep. 16, 2021

(30) Foreign Application Priority Data

Mar. 16, 2020  (TW) .................................. 109108537

(51) Int. Cl.
| | |
|---|---|
| *H01G 9/15* | (2006.01) |
| *H01G 9/00* | (2006.01) |
| *C09D 165/00* | (2006.01) |
| *C09D 5/00* | (2006.01) |
| *C09D 5/24* | (2006.01) |
| *H01G 9/004* | (2006.01) |

(52) U.S. Cl.
CPC .......... *H01G 9/0029* (2013.01); *C09D 5/002* (2013.01); *C09D 5/24* (2013.01); *C09D 165/00* (2013.01); *H01G 9/004* (2013.01); *H01G 9/15* (2013.01)

(58) Field of Classification Search
CPC ........ H01G 9/0029; H01G 9/004; H01G 9/15; C09D 5/002; C09D 5/24; C09D 165/00
See application file for complete search history.

(56) References Cited

U.S. PATENT DOCUMENTS

| | | | | |
|---|---|---|---|---|
| 9,761,378 B2* | 9/2017 | Shi | ...................... | H01G 9/0036 |
| 11,404,218 B2* | 8/2022 | Lin | ........... | H01G 9/028 |
| 2010/0165547 A1* | 7/2010 | Kuranuki | ............... | H01G 9/012 361/525 |
| 2011/0090621 A1* | 4/2011 | Chacko | ................ | H01G 9/0032 205/261 |
| 2012/0044615 A1* | 2/2012 | Takahashi | ............ | H01G 9/0036 29/25.03 |
| 2013/0083455 A1* | 4/2013 | Takahashi | .............. | H01G 11/56 427/80 |

(Continued)

FOREIGN PATENT DOCUMENTS

WO  WO-2014087617 A1 * 6/2014 ............... H01G 4/33

*Primary Examiner* — Dion R. Ferguson
(74) *Attorney, Agent, or Firm* — Li & Cai Intellectual Property (USA) Office (57) ABSTRACT

A capacitor element and a method for manufacturing the same are provided. The method for manufacturing the capacitor element includes steps of: providing a metal foil having an oxide layer formed on an outer surface of the metal foil; forming a surrounding barrier layer surroundingly on the oxide layer with the surrounding barrier layer surroundingly formed on an outer surface of the oxide layer; forming a priming layer onto the oxide layer; immersing the priming layer into a chemical synthesis solution for undergoing a chemical synthesis reaction; drying the priming layer so as to form a repaired layer on the priming layer; forming a conductive polymer layer on the repaired layer; and forming a conductive paste layer on the conductive polymer layer with the conductive paste layer including a silver paste layer.

3 Claims, 3 Drawing Sheets

(56) References Cited

U.S. PATENT DOCUMENTS

| | | | |
|---|---|---|---|
| 2013/0114184 A1* | 5/2013 | Kochi | H01G 9/025 |
| | | | 361/524 |
| 2016/0329156 A1* | 11/2016 | Chacko | H01G 9/15 |
| 2019/0279826 A1* | 9/2019 | Lin | H01G 9/0036 |
| 2021/0287856 A1* | 9/2021 | Lin | C09D 165/00 |
| 2021/0287857 A1* | 9/2021 | Lin | H01G 9/028 |

* cited by examiner

CAPACITOR ELEMENT

CROSS-REFERENCE TO RELATED PATENT APPLICATION

This application claims the benefit of priority to Taiwan Patent Application No. 109108537, filed on Mar. 16, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a capacitor element and a method for manufacturing the same, and more particularly to a capacitor element having a repaired layer and a method for manufacturing the same.

BACKGROUND OF THE DISCLOSURE

Capacitors are widely used in applications such as consumer appliances, computer motherboards, power supplies, communication products, and vehicles, and have become one of the indispensable elements in electronic devices. The main functions of the capacitors include filtering, bypassing, rectifying, coupling, decoupling, phase inverting, etc. The capacitors can be in different types according to different materials and purposes, including aluminum electrolytic capacitors, tantalum electrolytic capacitors, laminated ceramic capacitors, and thin film capacitors. In conventional technology, with the advantages of being small in size, and having large capacitance and excellent frequency characteristics, solid electrolytic capacitors are used to decouple power circuits of central processing units. In the solid electrolytic capacitors, liquid electrolytic solutions are replaced with solid electrolytes to act as cathodes. On the other hand, with the advantages of having high conductivity and being easily manufactured, conductive polymers have been widely used as materials of the cathodes of the solid electrolytic capacitors.

The conductive polymers, which can be used in the cathodes of the solid electrolytic capacitors, include polyaniline (PAni), polypyrrole (PPy), polythiophene (PTh), and derivatives thereof, in which poly(3,4-ethylenedioxythiophene):polystyrene sulfonic acid (PEDOT:PSS) composite has excellent electrical conductivity and a lower polymerization rate compared to other polymers such as the PAni and the PPy. Therefore, PEDOT:PSS composite can be polymerized at room temperature and has an easier preparation process. In addition, compared to other polymers, PEDOT:PSS composite has better weather resistance and heat resistance. Furthermore, PEDOT:PSS composite has good dispersibility, low production cost, high transparency and excellent processability. Hence, using PEDOT:PSS composite as a component of a conductive polymer layer on the cathodes of the capacitors would bring about a great improvement in electrical properties of the capacitors.

However, there is still a need for a capacitor element and a method for manufacturing the capacitor element that can improve the overall electrical properties of the capacitor.

SUMMARY OF THE DISCLOSURE

In response to the above-referenced technical inadequacies, the present disclosure provides a capacitor element and a method for manufacturing the capacitor element.

In one aspect, the present disclosure provides a method for manufacturing a capacitor element. The method for manufacturing a capacitor element includes the following steps. A metal foil having an oxide layer formed on an outer surface of the metal foil is provided. A surrounding barrier layer is formed onto the oxide layer. The surrounding barrier layer is surroundingly formed on an outer surface of the oxide layer so as to divide the outer surface of the oxide layer into a first part outer surface and a second part outer surface separated from each other. A priming layer is formed onto the second part outer surface of the oxide layer so as to partially encapsulate the oxide layer. The priming layer is immersed into a chemical synthesis solution containing a base and an acid. The priming layer is dried so as to form a repaired layer on the priming layer. A conductive polymer layer is formed onto the repaired layer. A conductive paste layer is formed onto the conductive polymer layer. The conductive paste layer includes a silver paste layer.

In certain embodiments, the acid is at least one selected from the group consisting of: acetic acid, boric acid, phosphoric acid, malonic acid, succinic acid, glutaric acid, adipic acid, pimelic acid, suberic acid, maleic acid, tartaric acid, phthalic acid, citric acid, oxalic acid, tartronic acid, malic acid, cyclohexanetricarboxylic acid, benzoic acid, gluconic acid, ethylenediaminetetraacetic acid and salts thereof. The base is at least one selected from the group consisting of: organic amine and salts thereof, sodium hydroxide, potassium hydroxide, ammonium hydroxide, borax, potassium carbonate, potassium bicarbonate, sodium carbonate, and sodium bicarbonate.

In certain embodiments, the organic amine and salts thereof are at least one selected from the group consisting of: diamine having 2 to 10 carbon atoms, triamine having 2 to 10 carbon atoms, cyclic amine having 4 to 12 carbon atoms, aromatic amine having 4 to 12 carbon atoms, and salts thereof.

In certain embodiments, the organic amine and salts thereof are at least one selected from the group consisting of: ethylenediamine, propylenediamine, butanediamine, pentanediamine, hexamethylenediamine, heptanediamine, octanediamine, nonanediamine, decanediamine, tetramethylethylenediamine, tetramethylpropanediamine, tetramethylbutanediamine, tetramethylpentanediamine, tetramethylhexamethylenediamine, tetramethylheptanediamine, tetramethyloctanediamine, tetramethylnonanediamine, tetramethyl decanediamine, o-phenylenediamine, m-phenylenediamine, p-phenylenediamine, diethylenetriamine, 1-(2-hydroxyethyl)piperazine, 1-(2-aminoethyl)piperazine, 4-(2-aminoethyl)morpholine, 1-(2-pyridyl)piperazine, 1-(2-aminoethyl)piperidine, 1-(3-aminopropyl)imidazole, melamine, and corresponding borate, phosphate, or carboxylate thereof.

In certain embodiments, a molar ratio of the base to the acid ranges from 1:0.3 to 1:0.7.

In certain embodiments, the chemical synthesis solution further includes an aminobenzoic acid derivative. The aminobenzoic acid derivative is at least one of aminobenzoic acid or aminophthalic acid.

In certain embodiments, the aminobenzoic acid derivative is selected from the group consisting of: para-aminobenzoic acid, meta-aminobenzoic acid, ortho-aminobenzoic acid, para-dimethylaminobenzoic acid, 2-aminoterephthalic acid, 3-aminophthalic acid, 5-aminoisophthalic acid, and any combination thereof.

In certain embodiments, the chemical synthesis solution further includes an auxiliary agent. The auxiliary agent is selected from the group consisting of:

ammonium dihydrogen phosphate, diammonium hydrogen phosphate, ethylenediaminetetraacetic acid, potassium sodium tartrate, sodium citrate, ammonium citrate, sodium gluconate, ammonium gluconate, and any combination thereof.

In certain embodiments, a molar ratio of the base to the auxiliary agent ranges from 1:0.01 to 1:0.5.

In another aspect, the present disclosure provides a capacitor element. The capacitor element includes a metal foil, a surrounding barrier layer, a priming layer, a repaired layer, a conductive polymer layer, and a conductive paste layer. The metal foil has an oxide layer formed onto an outer surface of the metal foil. The surrounding barrier layer is formed on an outer surface of the oxide layer so as to divide the outer surface of the oxide layer into a first part outer surface and a second part outer surface separated from each other. The priming layer is formed on the second part outer surface of the oxide layer so as to partially encapsulate the oxide layer. The repaired layer is formed on the priming layer. A material of the repaired layer is made from a reaction between a base and an acid. The conductive polymer layer is formed on the repaired layer. The conductive paste layer is formed on the conductive polymer layer. The conductive paste layer includes a silver paste layer. The capacitor element has a leakage current lower than or equal to 100 µA measured at a condition of 25 V and 10 mA after being loaded at a temperature of 125° C. for 300 hours.

In certain embodiments, a material of the priming layer is synthesized by chemical polymerization. The material of the priming layer is polydioxyethylthiophene, self-doped polydioxyethylthiophene, polydioxyethylthiophene:polystyrenesulfonic acid composite or any combination thereof.

In certain embodiments, the conductive paste layer includes a carbon paste layer formed between the conductive polymer layer and the silver paste layer.

In certain embodiments, the capacitor element is manufactured by the method mentioned above.

Therefore, by virtue of "immersing the priming layer into a chemical synthesis solution" and "forming a repaired layer onto the priming layer", the electrical properties of the capacitor element are enhanced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
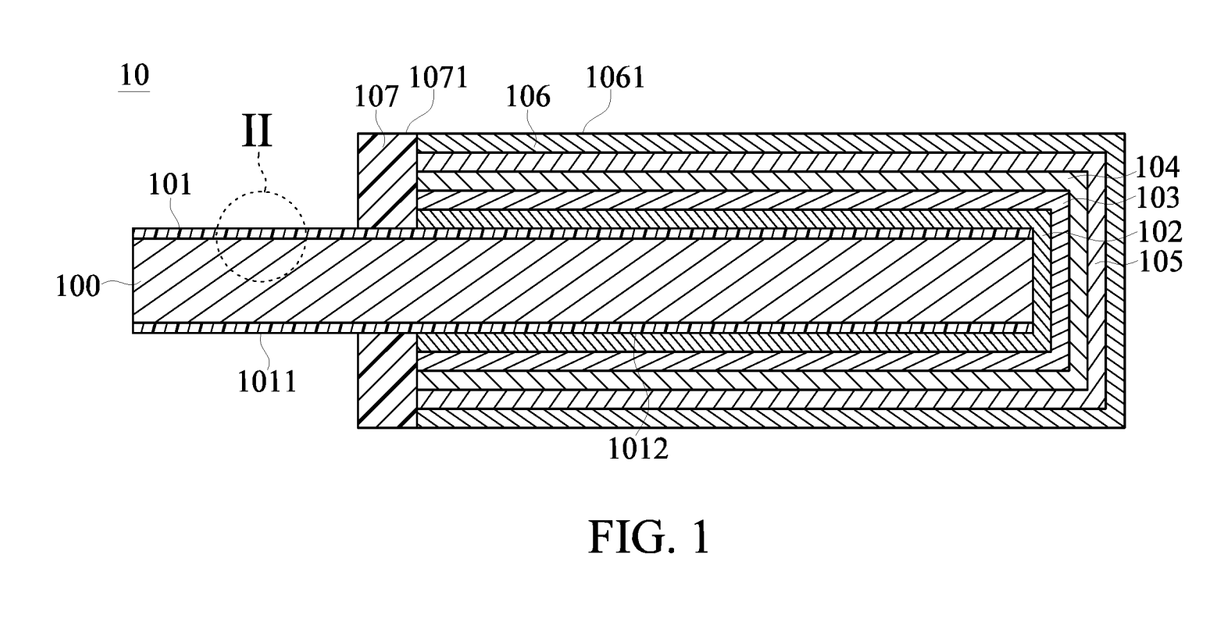
FIG. 1 is a cross-sectional side view of a capacitor element of the present disclosure.

Referring to FIG. 1, a capacitor can be a capacitor element 10 in a stacked solid electrolytic capacitor package structure. The capacitor element 10 includes a metal foil 100, an oxide layer 101, a priming layer 102, a repaired layer 103, a conductive polymer layer 104, and a conductive paste layer.

Figure 2:
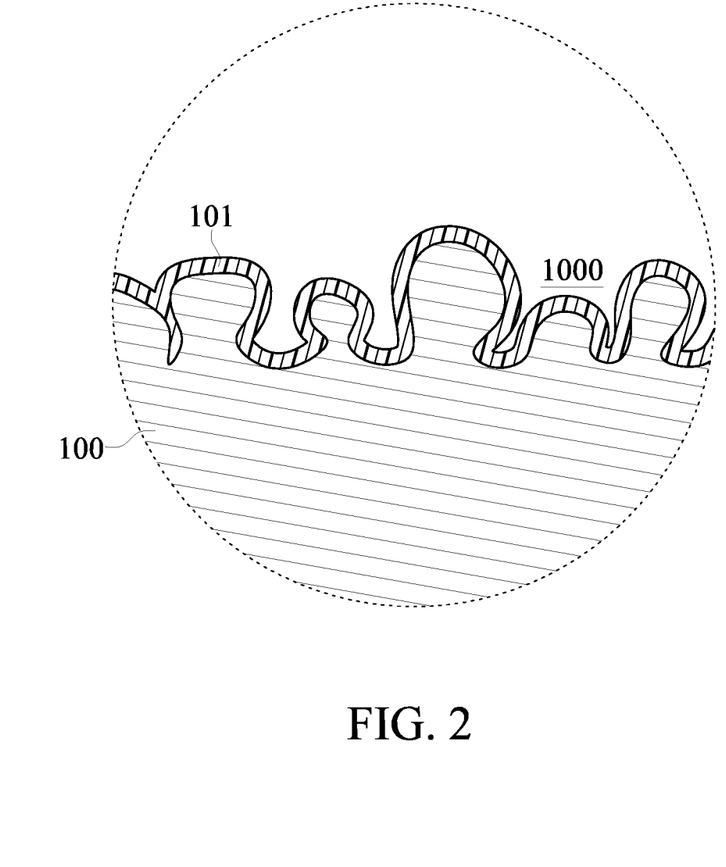
FIG. 2 shows an enlarged view of part II of FIG. 1.

According to different practical requirements, a material of the metal foil 100 can be aluminum, copper, or other metals. A porous corrosion layer is formed on an outer surface of the metal foil 100. In other words, the metal foil 100 can be a corrosion metal foil having the porous corrosion layer. An oxide layer 101 is formed on the outer surface of the metal foil 100, and the outer surface of the metal foil 100 is cladded by the oxide layer 101. Since the porous corrosion layer is formed on the outer surface of the metal foil 100, the oxide layer 101 is formed along the shape of the porous corrosion layer of the metal foil 100 as shown in FIG. 2. Microscopically speaking, micropores 1000 are concaves which are formed on the outer surface of the metal foil 100, and a part of the oxide layer 101 is formed in the micropores 1000 of the metal foil 100. The priming layer 102 is disposed on an outer surface of the oxide layer 101, and the oxide layer 101 is partially encapsulated by the priming layer 102. The repaired layer 103 is disposed on the priming layer 102. The conductive polymer layer 104 is disposed on an outer surface of the repaired layer 103, and the outer surface of the repaired layer 103 is completely encapsulated by the conductive polymer layer 104. The conductive paste layer is disposed on an outer surface of the conductive polymer layer 104, and the outer surface of the conductive polymer layer 104 is completely encapsulated by the conductive paste layer. In brief, the oxide layer 101, the priming layer 102, the repaired layer 103, the conductive polymer layer 104, and the conductive paste layer are sequentially disposed on the outer surface of the metal foil 100 from inside to outside.

Specifically, the conductive paste layer includes at least a silver paste layer 106. The silver paste layer 106 can be directly disposed on the outer surface of the conductive polymer layer 104. In other embodiments, the conductive paste layer includes a carbon paste layer 105 and the silver paste layer 106 as shown in FIG. 1. The carbon paste layer 105 is disposed on the outer surface of the conductive polymer layer 104, and the outer surface of the conductive polymer layer 104 is completely encapsulated by the carbon paste layer 105. The silver paste layer 106 is formed on an outer surface of the carbon paste layer 105, and the outer surface of the carbon paste layer 105 is completely encapsulated by the silver paste layer 106. In other words, the conductive paste layer includes at least the silver paste layer 106. Further, the conductive paste layer can optionally include the carbon paste layer 105 which is disposed between the conductive polymer layer 104 and the silver paste layer 106.

In addition, referring to FIG. 1, the capacitor element 10 further includes a surrounding barrier layer 107. The surrounding barrier layer 107 is surroundingly formed on a part of the outer surface of the oxide layer 101, so that the outer surface of the oxide layer 101 is divided into a first part outer surface 1011 and a second part outer surface 1012 separated from each other. The priming layer 102 is disposed on the second part outer surface 1012 of the oxide layer 101, and the second part outer surface 1012 of the oxide layer 101 is completely encapsulated by the priming layer 102.

A distance between an outer peripheral surface 1071 of the surrounding barrier layer 107 and the oxide layer 101 is longer than, equal to, or shorter than a distance between an outer peripheral surface 1061 of the silver paste layer 106 and the oxide layer 101. Preferably, the distance between the outer peripheral surface 1071 of the surrounding barrier layer 107 and the oxide layer 101 is longer than or equal to the distance between the outer peripheral surface 1061 of the silver paste layer 106 and the oxide layer 101. In the present embodiment, the distance between the outer peripheral surface 1071 of the surrounding barrier layer 107 and the oxide layer 101 is equal to the distance between the outer peripheral surface 1061 of the silver paste layer 106 and the oxide layer 101. However, the present disclosure is not limited thereto.

In the present embodiment, an end of the priming layer 102, an end of the repaired layer 103, an end of the conductive polymer layer 104, an end of the carbon paste layer 105, and an end of the silver paste layer 106 abut upon the surrounding barrier layer 107 or are spaced apart from the surrounding barrier layer 107. In a preferable embodiment, the end of the priming layer 102, the end of the repaired layer 103, the end of the conductive polymer layer 104, the end of the carbon paste layer 105, and the end of the silver paste layer 106 abut upon the surrounding barrier layer 107, so that a length of the priming layer 102, a length of the repaired layer 103, a length of the conductive polymer layer 104, a length of the carbon paste layer 105, and a length of the silver paste layer 106 are limited by the surrounding barrier layer 107. Furthermore, according to different practical requirements, a material of the surrounding barrier layer 107 can be any conductive material, such as aluminum or copper, or any insulating material, such as epoxy resin or silicon resin. However, the present disclosure is not limited thereto.

Figure 3:
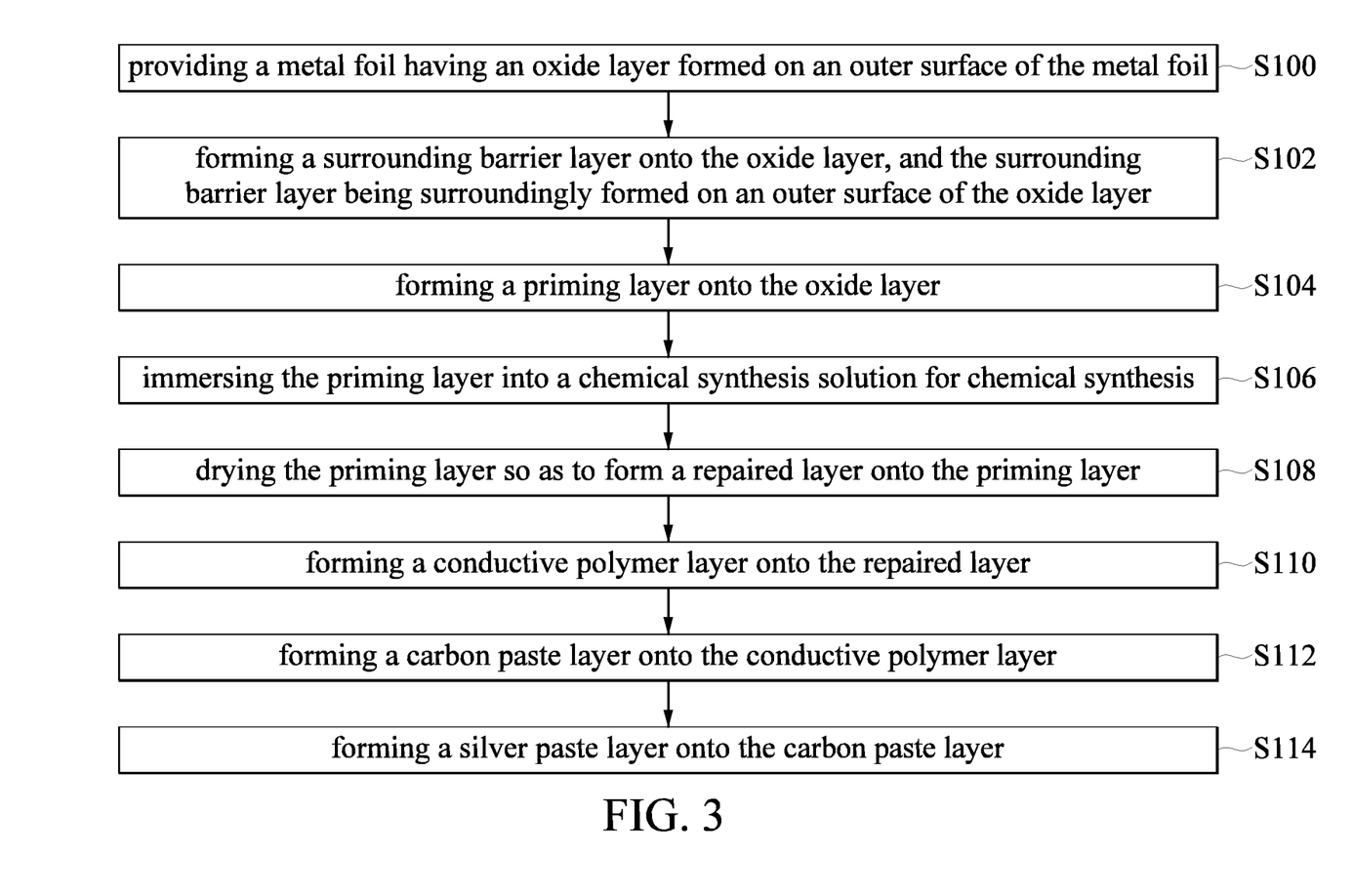
FIG. 3 is a flow chart of a method for manufacturing the capacitor element of the present disclosure.

Referring to FIG. 1 and FIG. 3, the capacitor element 10 mentioned above can be manufactured by a method of the present disclosure as illustrated in a flow chart shown in FIG. 3.

In step S100, a metal foil 100 is provided. The metal foil 100 is oxidized, and then an oxide layer 101 is formed onto an outer surface of the metal foil 100.

In step S102, a surrounding barrier layer 107 is formed onto the oxide layer 101. The surrounding barrier layer 107 is surroundingly disposed on a part of an outer surface of the oxide layer 101 so as to divide the outer surface of the oxide layer 101 into a first part outer surface 1011 and a second part outer surface 1012 which are separate from each other.

In step S104, a priming layer 102 is formed onto the second part outer surface 1012 of the oxide layer 101, so that the oxide layer 101 is partially encapsulated by the priming layer 102. A material of the priming layer 102 is synthesized by chemical polymerization, and the material of the priming layer 102 can be polydioxyethylthiophene, self-doped polydioxyethylthiophene, polydioxyethylthiophene:polystyrenesulfonic acid composite or any combination thereof.

When the priming layer 102 is formed onto the oxide layer 101 (step S104), the oxide layer 101 may consequently be damaged. Therefore, in step S106, the priming layer 102 is immersed into a chemical synthesis solution for undergoing a chemical synthesis reaction, so that the oxide layer 101 can be repaired electrochemically. The chemical synthesis solution contains a base and an acid.

To enhance the effect of the chemical synthesis reaction, the priming layer 102 is immersed into the chemical synthesis solution to undergo the chemical synthesis reaction at a temperature from 30° C. to 80° C. for 20 minutes to 60 minutes. In the present disclosure, a solid content of the chemical synthesis solution ranges from 1 wt % to 25 wt % and a pH value of the chemical synthesis solution ranges from 3 to 7 so that the efficiency of the chemical synthesis reaction can be improved.

In the present embodiment, the acid is a weak acid. Specifically, the acid of the chemical synthesis solution is at least one selected from the group consisting of: acetic acid, boric acid, phosphoric acid, malonic acid, succinic acid, glutaric acid, adipic acid, pimelic acid, suberic acid, maleic acid, tartaric acid, phthalic acid, citric acid, oxalic acid, propionic acid, malic acid, cyclohexanetricarboxylic acid, benzoic acid, gluconic acid, ethylenediaminetetraacetic acid, and salts thereof. Preferably, the salt of the acid is at least one of sodium salts, potassium salts, or ammonium salts. However, the example illustrated above is only one of the available embodiments and should not be taken as limiting the scope of the present disclosure.

On the other hand, the base is at least one of organic amine and salts thereof, sodium hydroxide, potassium hydroxide, ammonium hydroxide, borax, potassium carbonate, potassium bicarbonate, sodium carbonate, and sodium bicarbonate. In a preferable embodiment, the salt of the organic amine is at least one of borates, phosphates, or carboxylates. However, the example illustrated above is only one of the available embodiments and should not be taken as limiting the scope of the present disclosure.

In a preferable embodiment, the base of the chemical synthesis solution is organic amine and salts thereof. The organic amine and salts thereof is at least one selected from the group consisting of: diamine having 2 to 10 carbon atoms, triamine having 2 to 10 carbon atoms, cyclic amine having 4 to 10 carbon atoms, aromatic amine having 4 to 10 carbon atoms, and salts thereof.

Specifically, the diamine having 2 to 10 carbon atoms can be ethylenediamine, propylene diamine, butanediamine, pentanediamine, hexamethylenediamine, heptanediamine, octanediamine, nonanediamine, decanediamine, tetramethylethylenediamine, tetramethylpropanediamine, tetramethylbutanediamine, tetramethylpentanediamine, tetramethylhexamethylenediamine, tetramethylheptanediamine, tetramethyloctanediamine, tetramethylnonanediamine, tetramethyldecanediamine, ortho-phenylenediamine, meta-phenylenediamine, para-phenylenediamine, or salts thereof, but is not limited thereto. The triamine having 2 to 10 carbon atoms can be diethylenetriamine or salts thereof, but is not limited thereto. The cyclic amine having 4 to 12 carbon atoms can be piperazine, morpholine, piperidine, imidazole, or melamine, but is not limited thereto. For example, 1-(2-hydroxyethyl)piperazine, 1-(2-aminoethyl)piperazine, 4-(2-aminoethyl)morpholine, 1-(2-pyridyl)piperazine, 1-(2-aminoethyl)piperidine, 1-(3-aminopropyl)imidazole, or melamine, but is not limited thereto. The aromatic amine having 4 to 12 carbon atoms can be 4,4'-diaminodiphenylsulfone, but is not limited thereto.

In other embodiment, the chemical synthesis solution further includes an auxiliary agent. The addition of the auxiliary agent can help removing metal ions and impurities in the priming layer 102. The auxiliary agent can be a metal chelating agent or a weak acid salt. For example, the auxiliary agent can be selected from a group consisting of: ammonium dihydrogen phosphate, diammonium hydrogen phosphate, ethylenediaminetetraacetic acid, potassium sodium tartrate, sodium citrate, ammonium citrate, sodium gluconate, ammonium gluconate, or any combination thereof.

In the chemical synthesis solution, a molar ratio of the base to the auxiliary agent ranges from 1:0.01 to 1:0.5. Preferably, the molar ratio of the base to the auxiliary agent ranges from 1:0.01 to 1:0.3.

In another embodiment, the chemical synthesis solution further includes an aminobenzonic acid derivative. The addition of the aminobenzonic acid derivative can enhance the repairing effect of the chemical synthesis solution to the oxide layer 101. After adding the aminobenzonic acid derivative, a solid content of the chemical synthesis solution ranges from 1.0 wt % to 25 wt %. The aminobenzonic acid derivative can be at least one of aminobenzoic acid or aminophthalic acid, either substituted or unsubstituted. That is, the aminobenzonic acid derivative can have one carboxylic acid group or two carboxylic acid groups. For example, when the aminobenzonic acid derivative has one carboxylic acid group, the aminobenzonic acid derivative can be para-aminobenzoic acid, meta-aminobenzoic acid, or ortho-aminobenzoic acid. When the aminobenzonic acid derivative has two carboxylic acid groups, the aminobenzonic acid derivative can be 2-aminoterephthalic acid, 2-aminoisophthalic acid acid, 4-aminoisophthalic acid acid, 5-aminoisophthalic acid, 3-aminophthalic acid, or 4-aminophthalic acid. However, the present disclosure is not limited thereto.

In step S108, the priming layer 102 is dried, and then a repaired layer 103 is formed onto the priming layer 102. The repaired layer 103 of the capacitor element 10 can decrease the leakage current of the capacitor element 10 and enhance the electrical properties of the capacitor element 10. In the present embodiment, the priming layer 102 is dried at a temperature of 70° C. to 150° C. for 10 to 60 minutes. However, the drying method is not limited thereto. As long as the priming layer 102 can be dried and then the repaired layer 103 can be formed onto the priming layer 102, such configuration will be in the scope of the present disclosure.

In step S110, a conductive polymer layer 104 is formed onto the repaired layer 103. A material of the conductive polymer layer 104 includes polyaniline (PAni), polypyrrole (PPy), polythiophene (PTh), and derivatives thereof. The PEDOT:PSS composite has a good conductivity, and the PEDOT:PSS composite has a low polymerizing rate compared to other polymers (such as PAni or PPy), so that the difficulty in polymerizing the PEDOT:PSS composite at room temperature can be reduced. Further, the PEDOT:PSS composite has better weather resistance and better thermal resistance than other polymers. Moreover, the PEDOT:PSS composite has good dispersivity, low production cost, high transparency, and excellent processability. Therefore, using the PEDOT:PSS composite as a material of the conductive polymer layer 104 can enhance the electrical properties of the capacitor element 10. In a preferable embodiment, the material of the conductive polymer layer 104 is the PEDOT:PSS composite.

In step S112, a carbon paste layer 105 is formed onto the conductive polymer layer 104.

In step S114, a silver paste layer 106 is formed onto the carbon paste layer 105, and then the capacitor element 10 is obtained. A content of the silver paste layer 106 can vary according to different practical requirements. For example, based on a total weight of a material of the silver paste layer 106 being 100 wt %, the material of the silver paste layer 106 contains 40 wt % to 90 wt % of silver powder, 0.1 wt % to 5 wt % of a dispersant, 1 wt % to 10 wt % of a aqueous resin, 5 wt % to 40 wt % of a solvent, and a remnant of water. However, the present disclosure is not limited thereto.

[Repairing Effect Test]

In order to prove the effectiveness of the chemical synthesis solution of the present disclosure, different chemical synthesis solutions are prepared. The specific contents of the chemical synthesis solutions of Examples 1 to 7 (E1 to E7) are listed in Table 1. The capacitor element 10 in Comparative Example 1 is not immersed in the chemical synthesis solution.

Specifically, the chemical synthesis solutions of Examples 1 and 2 are prepared by adding an appropriate amount of acid into a base solution with a concentration of 1M, so that the molar ratio of the base to the acid is 1:0.5. The preparation of the chemical synthesis solutions of Examples 1 and 2 can thus be completed.

Specifically, the chemical synthesis solutions of Examples 3 to 5 are prepared by adding an appropriate amount of acid and an appropriate amount of auxiliary agent into a base solution with a concentration of 1M, so that the molar ratio of the base to the acid is 1:0.5, and the molar ratio of the base to the auxiliary agent is 1:0.2. The preparation of the chemical synthesis solutions in Examples 3 to 5 can thus be completed.

Specifically, the chemical synthesis solutions of Examples 6 and 7 are prepared by adding an appropriate amount of aminobenzonic acid, an appropriate amount of acid, and an appropriate amount of auxiliary agent into a base solution with a concentration of 0.8M, so that a concentration of the aminobenzonic acid is 0.2M, the molar ratio of the base to the acid is 1:0.5, and the molar ratio of the base to the auxiliary agent is 1:0.2. The preparation of the chemical synthesis solutions in Examples 6 and 7 can thus be completed.

TABLE 1

| | Chemical synthesis solution | | | |
|---|---|---|---|---|
| | Base | Acid | Aminobenzonic acid | Auxiliary agent |
| E1 | Pentanediamine | Adipic acid | — | — |
| E2 | Ammonium hydroxide | Acetic acid | — | — |
| E3 | 1-(2-hydroxyethyl)piperazine | Benzoic acid | — | Ethylenediaminetetraacetic acid |
| E4 | 1-(2-aminoethyl)piperidine | Boric acid | — | Sodium citrate |
| E5 | 1-(2-aminoethyl)piperazine | P-toluenesulfonic acid | — | Potassium sodium tartrate |
| E6 | 1-(2-aminoethyl)piperazine | Phosphoric acid | P-aminobenzoic acid | Potassium sodium tartrate |
| E7 | 1-(2-aminoethyl)piperazine | Phosphoric acid | 5-aminoisophthalic acid | Potassium sodium tartrate |

After being immersed in the chemical synthesis solution, the priming layer 102 undergoes a chemical synthesis reaction at a temperature of 30° C. to 80° C. for 20 minutes to 60 minutes. Subsequently, the priming layer 102 is dried at a temperature of 70° C. to 150° C. for 10 minutes to 60 minutes. After being cooled to room temperature, a leakage current of the capacitor element 10 is measured at a condition of 25 V and 10 mA. The results of measuring the leakage current of the capacitor element 10 are listed in Table 2.

TABLE 2

| | Leakage current |
|---|---|
| Comparative Example 1 | 803 µA |
| Example 1 | 15 µA |
| Example 2 | 27 µA |
| Example 3 | 13 µA |
| Example 4 | 39 µA |
| Example 5 | 18 µA |
| Example 6 | 22 µA |
| Example 7 | 54 µA |

According to the results of Table 2, comparing to Comparative Example 1, the chemical synthesis solution of the present disclosure can repair the oxide layer 101 so that the electrical property of the capacitor element 10 can be enhanced. For example, the leakage current can be reduced. Specifically, the leakage current of the capacitor element 10 of the present disclosure is lower than 100 µA. Preferably, the leakage current of the capacitor element 10 of the present disclosure is lower than 80 µA.

When the chemical synthesis solution contains the base and the acid, the leakage current of the capacitor element 10 is lower than 30 µA (Examples 1 and 2). When the chemical synthesis solution contains the base, the acid, and the auxiliary agent, the leakage current of the capacitor element 10 is lower than 40 µA (Examples 3 to 5). When the chemical synthesis solution contains the base, the acid, the auxiliary agent, and the aminobenzonic acid derivative, the leakage current of the capacitor element 10 is lower than 60 µA (Examples 6 and 7).

In conclusion, the capacitor element 10 and the method for manufacturing the same have technical features of "immersing the priming layer 102 into a chemical synthesis solution" and "forming a repaired layer 103 onto the priming layer 102", so that the electrical properties of the capacitor element 10 are enhanced.

Further, the capacitor element 10 and the method for manufacturing the same have a technical feature of "the chemical synthesis solution further includes an aminobenzoic acid derivative", so that the electrical properties of the capacitor element 10 are enhanced and the leakage current of the capacitor element 10 is lower than 60 µA.

Further, the capacitor element 10 and the method for manufacturing the same have a technical feature of "the chemical synthesis solution further includes an auxiliary agent", so that the electrical properties of the capacitor element 10 are enhanced and the leakage current of the capacitor element 10 is lower than 40 µA.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A capacitor element, comprising
a metal foil having an oxide layer formed onto an outer surface of the metal foil;
a surrounding barrier layer surroundingly formed on an outer surface of the oxide layer so as to divide the outer surface of the oxide layer into a first part outer surface and a second part outer surface separated from each other;
a priming layer formed on the second part outer surface of the oxide layer so as to partially encapsulate the oxide layer;
a repaired layer formed on the priming layer, and a material of the repaired layer being made from a reaction between a base and an acid;
a conductive polymer layer formed on the repaired layer; and
a conductive paste layer formed on the conductive polymer layer, and the conductive paste layer including a silver paste layer;
wherein the priming layer and the conductive polymer layer are separated from each other by the repaired layer;
wherein an end of the priming layer, an end of the repaired layer, an end of the conductive polymer layer, and an end of the silver paste layer abut against the surrounding barrier layer, so that the repaired layer is completely enclosed by the priming layer, the conductive polymer layer and the surrounding barrier layer;
wherein the capacitor element has a leakage current lower than or equal to 100 µA measured at a condition of 25 V and 10 mA after being loaded at a temperature of 125° C. for 300 hours.

2. The capacitor element according to claim 1, wherein a material of the priming layer is synthesized by chemical polymerization, and the material of the priming layer is polydioxyethylthiophene, self-doped polydioxyethylthiophene, polydioxyethylthiophene:polystyrenesulfonic acid composite, or any combination thereof.

3. The capacitor element according to claim 1, wherein the conductive paste layer includes a carbon paste layer formed between the conductive polymer layer and the silver paste layer.

* * * * *